United States Patent
Vogel et al.

(10) Patent No.: US 10,614,808 B2
(45) Date of Patent: Apr. 7, 2020

(54) MOBILE DEVICE FOR SPEECH INPUT AND TEXT DELIVERY

(71) Applicant: Nuance Communications, Inc., Burlington, MA (US)

(72) Inventors: Markus Vogel, Dusseldorf (DE); Andreas Neubacher, Vienna (AT)

(73) Assignee: Nuance Communications, Inc., Burlington, MA (US)

( * ) Notice: Subject to any disclaimer, the term of this patent is extended or adjusted under 35 U.S.C. 154(b) by 167 days.

(21) Appl. No.: 14/416,156

(22) PCT Filed: Jun. 30, 2014

(86) PCT No.: PCT/US2014/044893
§ 371 (c)(1),
(2) Date: Jan. 21, 2015

(87) PCT Pub. No.: WO2016/003419
PCT Pub. Date: Jan. 7, 2016

(65) Prior Publication Data
US 2016/0125881 A1 May 5, 2016

(51) Int. Cl.
*G10L 15/26* (2006.01)
*G06F 16/683* (2019.01)
(Continued)

(52) U.S. Cl.
CPC ............ *G10L 15/26* (2013.01); *G06F 16/685* (2019.01); *G06F 17/2205* (2013.01);
(Continued)

(58) Field of Classification Search
CPC ... G10L 15/26; G10L 15/22; G10L 2015/223; G06F 17/2205; G06F 17/2785; G06F 17/30746; G06F 21/30
(Continued)

(56) References Cited

U.S. PATENT DOCUMENTS

2008/0059173 A1* 3/2008 Gilbert .................. G10L 15/265
704/235
2010/0228547 A1* 9/2010 Scott ...................... G06Q 30/02
704/235
(Continued)

FOREIGN PATENT DOCUMENTS

WO 2008/028029 A2 3/2008

OTHER PUBLICATIONS myEcho-Bringing iOS quality speech recognition and dictation to Windows—GettingStarted Retrieved from <http://myechoapp.com/download> on Jun. 12, 2014.
(Continued)

*Primary Examiner* — Bharatkumar S Shah
(74) *Attorney, Agent, or Firm* — Brian J. Colandreo; Michael T. Abramson; Holland & Knight LLP

(57) ABSTRACT

Aspects of the disclosure provide systems and methods for facilitating dictation. Speech input may be provided to an audio input device of a computing device. A speech recognition engine at the computing device may obtain text corresponding to the speech input. The computing device may transmit the text to a remotely-located storage device. A login webpage that includes a session identifier may be accessed from a target computing device also located remotely relative to the storage device. The session identifier may be transmitted to the storage device and, in response, a text display webpage may be received at the target computing device. The text display webpage may include the speech-derived text and may be configured to automatically copy the text to a copy buffer of the target computing device. The speech-derived text may also be provided to native applications at target computing devices or NLU engines for natural language processing.

17 Claims, 10 Drawing Sheets

(51) Int. Cl.
    *G06F 17/22* (2006.01)
    *G06F 17/27* (2006.01)
    *G10L 15/22* (2006.01)
(52) U.S. Cl.
    CPC .......... *G06F 17/2785* (2013.01); *G10L 15/22* (2013.01); *G10L 2015/223* (2013.01)
(58) Field of Classification Search
    USPC ............................................................ 704/9
    See application file for complete search history.

(56) References Cited

U.S. PATENT DOCUMENTS

2013/0132833 A1\* 5/2013 White ..................... G06F 3/048
                                                                  715/704

2014/0096220 A1\* 4/2014 Da Cruz Pinto ....... G06F 21/00
                                                                  726/9

OTHER PUBLICATIONS myEcho-Bringing iOS quality speech recognition and dictation to Windows—FAQ Retrieved from <http://myechoapp.com/faq> on Jun. 12, 2014.

myEcho-Bringing iOS quality speech recognition and dictation to Windows—Home Page Retrieved from <http://myechoapp.com> on Jun. 12, 2014.

International Search Report and Written Opinion dated Oct. 2, 2014 (PCT/US2014/044893); ISA/US.

Akinobu Lee: "The Julius book 4.1.5", May 17, 2010 (May 17, 2010), XP055140555.

\* cited by examiner

MOBILE DEVICE FOR SPEECH INPUT AND TEXT DELIVERY

BACKGROUND

Speech recognition refers to the process of converting an acoustic signal of spoken words into text. Historically speech recognition has been viewed as a complex problem due to a variety of factors that can affect the accuracy of the resulting text. Such factors include distortions in the acoustic signal caused by background noise as well as variations in the pronunciation, volume, and speed of the speaker. Accordingly the performance of automatic speech recognition systems may, in some cases, depend on the computing power available to process the acoustic signal and the techniques employed to recognize the speech.

Historically mobile computing devices have been limited in their ability to perform speech recognition. Some mobile computing devices, for example, may have lacked sufficient computing power to quickly process an acoustic signal and accurately convert the acoustic signal into text. In addition, limited network connectivity or limited network bandwidth may have prevented some computing devices from providing an acoustic signal to another computing device having sufficient processing power to process and convert the acoustic signal.

While attempts have been made to address these limitations, there remains room for improvement. One example approach, a mobile device may only be used to provide speech-derived text to a computing device if the computing device has installed a companion application that pairs the computing device with the mobile device. It will thus be appreciated that this example approach would not be suitable for computing devices that do not have the companion application installed.

BRIEF SUMMARY

The following presents a simplified summary in order to provide a basic understanding of some aspects of the disclosure. The summary is not an extensive overview of the disclosure and is not intended to identify key or critical elements or to delineate the scope of protection sought. The following summary merely presents some concepts of the disclosure in a simplified form as an introduction to the more detailed description provided below.

As the processing power of mobile computing devices continues to increase, new opportunities arise for utilizing mobile computing devices in speech recognition efforts.

A first aspect described herein provide a system for facilitating dictation. A speech recognition module may reside at a computing device and generate text corresponding to speech input received at an audio input device of the first computing device. A storage device may be located remotely relative to the computing device and may be in signal communication with the speech recognition module. The storage device may store the text generated by the speech recognition module and received from the computing device. A webserver may be in signal communication with the storage device. The webserver may be configured to provide a login webpage that includes a session identifier to a target computing device. The target computing device may also be located remotely relative to the webserver. The webserver may receive the session identifier from either of the computing devices and, in response, provide a text display webpage to the target computing device. The text display webpage may include the text received from the computing device and may be configured to automatically copy the text to a copy buffer of the target computing device.

A second aspect described herein provides a computer-implemented method of performing dictation. Speech input may be provided to an audio input device of a computing device. A speech recognition engine residing at the computing device may obtain text corresponding to the speech input. The computing device may transmit the text, to a storage device that is located remotely relative to the computing device. A login webpage that includes a session identifier may be accessed from a target computing device that is also located remotely relative to the storage device. The session identifier may be transmitted to the storage device from either of the computing devices. A text display webpage may also be received at the target computing device that includes the speech-derived text. The text display webpage may also be configured to automatically copy the text to a copy buffer of the target computing device.

Additional aspects will be appreciated with the benefit of the additional description provided in further detail below.

BRIEF DESCRIPTION OF THE DRAWINGS

The details of these and other embodiments of the disclosure are set forth in the accompanying drawings and description below. Other features and advantages of aspects of the disclosure will be apparent from the description and drawings.

DETAILED DESCRIPTION

Aspects of the present disclosure are directed toward a speech recognition system and a method of recognizing speech. More specifically the disclosures provided below describe a speech recognition system and method in which a user may provide speech to a mobile speech recognition device, obtain text corresponding to that speech at the mobile speech recognition device, and transmit the text to a remote storage location such that the text is accessible to other computing devices via a network. The speech recognition system and method described below advantageously leverages the increased computing power of mobile devices to perform the text recognition as well as the ubiquitous nature of communication networks to make the recognized text available to multiple computing devices capable of communicating via such networks.

In addition, the speech recognition system and method provided enables a user to obtain speech-derived text from a mobile device at any target computing device equipped with a web browser and a network connection. Users may thus advantageously obtain speech-derived text at their own personal computing devices as well as computing devices the users do not own or control but at least have access or are granted access to. Furthermore once the speech-derived text has been obtained, it may be provided to various types of text-processing engines to provide further advantages as described in further detail below. Additional aspects and advantages will be appreciated with the benefit of the additional disclosures provided below.

Figure 1:
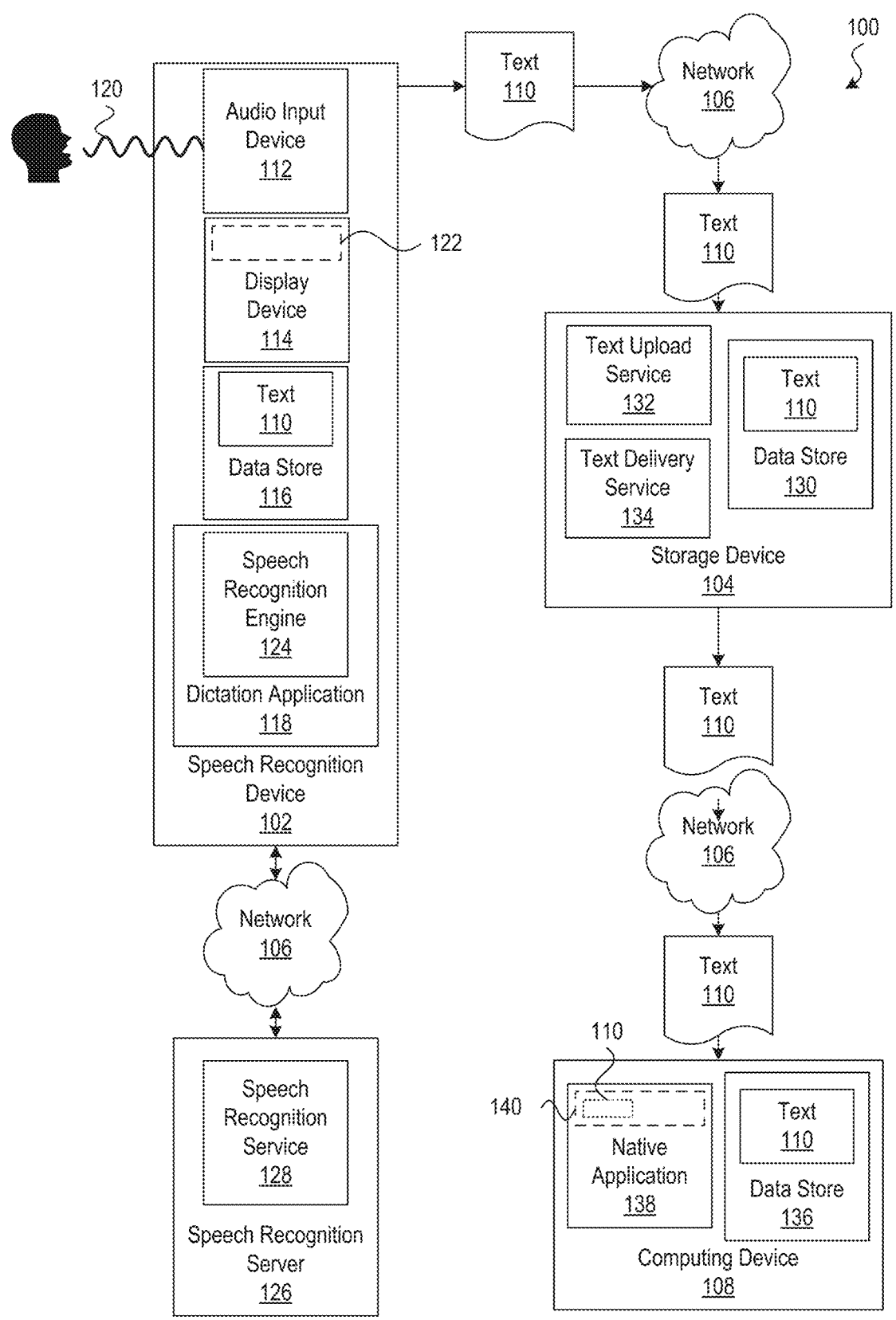
FIG. 1 is an example of an implementation of a speech recognition system according to illustrative aspects described herein.

Referring to FIG. 1, an example of an implementation of a speech recognition system 100 is shown. In the example speech recognition system 100, a speech recognition device 102 is in signal communication with a storage device 104 via a network 106 which is in turn in signal communication with a computing device 108 via a network 106. As seen in FIG. 1, the speech recognition device 102 is located remotely relative to the storage device 104 as well as the computing device 108. Likewise the storage device 104 is located remotely relative to the computing device 108. Accordingly the storage device 104 may be referred to as a remotely-located storage device or a remote storage device. The network 106 the speech recognition device 102, storage device 104, and computing device 108 utilize to communicate may be a wireless network (e.g., a cellular network), a wired network (e.g., a local intranet or the Internet), or a combination of wired and wireless networks. FIG. 1 also illustrates the flow of text 110 across the networks 106 from the speech recognition device 102 to the storage device 104 and to the computing device 108.

The speech recognition device 102, in this example, includes an audio input device 112, a display device 114, a data store 116, and a dictation application 118. The audio input device 112 receives speech input 120 from a user and generates an electrical signal that corresponds to the speech input 120. The audio input device 112 may be, for example, a microphone or any other kind of electroacoustic transducer that converts sound into an electric signal. The display device 114 presents a visual interface 122 at the speech recognition device 102. The visual interface 122 may be, for example, a graphical user interface (GUI) of the dictation application 118. As described in further detail below, the visual interface 122 may present the recognized text 110 at the display device 114. The speech recognition device 102 may also include an image input device (512 in FIG. 5) such as, e.g., a camera.

The data store 116 may store the text 110 obtained from the speech recognition process. The data store 116 may store the text 110 in a dictation record that includes fields for the text 110 and a date and time the speech input 120 was received from the user. Accordingly the data store 116 may store multiple dictation records each having a respective sample of recognized text 110 obtained from respective dictation sessions where the user provided speech input. The data store 116 may retain the text 110 until a delete command is received from the user at the speech recognition device. Alternatively the data store 116 may only retain the text 110 until the speech recognition device 102 uploads the text to the remote storage device 104, deleting the text from the data store once the upload is complete.

The dictation application 118 may be, for example, a software application that is installed and executes at the speech recognition device 102. The dictation application 118, in this example, includes a speech recognition engine 124 that the dictation application utilizes to process the electrical signal corresponding to the speech input 120 and generate the corresponding text 110. The speech recognition engine 124 may be configured to employ various speech recognition techniques to processes the signal corresponding to the speech input 120 and generate the corresponding text 110. Suitable speech recognition techniques will be appreciated by those skilled in the art of automatic speech recognition. It should be understood, however, that the principles of the present disclosure are not limited by the particular speech recognitions techniques that may be selectively employed in various implementations. Furthermore, in some example implementations, the dictation application 118 may be in signal communication via a network 106 with a speech recognition server 126 that provides a speech recognition service 128. The speech recognition engine 124 may utilize the speech recognition service 128 during the speech recognition process to assist with generating the text 110 corresponding to the speech input 120. The speech recognition engine 124 may, for example, retrieve from the speech recognition service 128 speech models, dictionaries, text corpora, or other resources useful for generating the text 110 that corresponds to the speech input 120.

The dictation application 118 may provide functionality that facilitates speech recognition at the speech recognition device 102. The dictation application 118 may, for example, provide functionality to initiate a speech input process and conclude the speech input process. The initiation and conclusion of the speech input process may occur in response to commands received as user input at the speech recognition device (e.g., touch commands) or, additionally or alternatively, automatically based upon a detected beginning and a detected end of the speech input 120. The dictation application 118 may also, for example, provide functionality to review and modify the recognized text 110 before uploading the text to the remote storage device 104. The dictation application 118 may provide a GUI that is presented at the display device 114 as the visual interface 122. The GUT of the dictation application 118 may include a text field that is populated with the recognized text 110, and the user may modify the text 110 in the text field using a physical or virtual keyboard of the speech recognition device 102. The dictation application 118 may thus also provide functionality to save any modifications made to the recognized text 110. Modifications may include, e.g., corrections of misrecognized words, addition or removal of punctuation, capitalization, and so forth.

The dictation application 118 may further provide functionality to initiate transmission of the text 110 to the remote storage device 104. As noted above, the dictation application 118 may, in some example implementations, upload the text 110 to the remote storage device 104 in response to a command received from the user thus advantageously allowing the user to review and, if desired, modify the text before upload. As also noted above, the speech recognition device 102 may, in other example implementations, automatically upload the text 110 to the remote storage device 104. In these other example implementations, the speech recognition device 102 may automatically process the speech input 120, generate the text 110, and upload the text to the remote storage device 104 in real time. Stated differently, the speech recognition, text generation, and text uploaded processes may have a collective real time factor of less than or equal to one. In further example implementations, the speech recognition device 102 may automatically upload the text 110 to the remote storage device 104 at predetermined periodic intervals, e.g., every 100, 250, or 500 milliseconds (ms). Other intervals may be selectively employed.

The dictation application 118 may additionally provide, for example, functionality to perform an authentication process with the remote storage device 104 and the speech recognition server 126. Upon authentication the storage device 104 may create a communication session for the speech recognition device 102 and utilize the communication session to receive the text 110 uploaded from the speech recognition device 102. The dictation application 118 may utilize login credentials (e.g., a username and password) received from the user during the authentication process. The communication session may uniquely identify one or more of the speech recognition device 102, the dictation application 118, or the user such that the text 110 may be appropriately associated with the user when stored at the storage device 104.

The speech recognition device 102 may be a mobile computing device configured for network communications. Such mobile computing devices may include, for example, mobile cellular telephones (e.g., "smartphones"), tablet computers, palmtop computers, and other types of mobile computing devices that will be appreciated by those skilled in the art. To facilitate network communications, the speech recognition device 102 includes a communication module such as, for example, a transceiver for sending and receiving network communications. For wireless communications, the transceiver may include an antenna for sending and receiving the wireless communications. Additional components and hardware of mobile computing devices have been omitted from FIG. 1 for clarity but will be recognized by those skilled in the art.

As seen in FIG. 1, the storage device 104 receives the text 110 via the network 106 from the speech recognition device 102. The storage device 104, in this example, includes a data store 130, a text upload service 132, and a text delivery service 134. The data store 130 may be, for example, a database (e.g., an SQL database) that stores dictation records similar to those that may be stored at the data store 116 of the speech recognition device 102. Such dictation records at the data store 130 may likewise include fields for the text 110 and a date and time the speech input 120 was received from the user. The dictation records of the data store 130 at the remote storage device 104 may also include one or more fields to uniquely identify the user, dictation application, or speech recognition device that provided the speech input 120 corresponding to the text. The data store 130 may, for example, associate each dictation with a user account based on the unique identifier received with the text 110 uploaded from the speech recognition device 102. In this way, the e remote storage device 104 may advantageously serve as a storage location for multiple speech recognition devices respectively associated with multiple users.

The text upload service 132 and the text delivery service 134 may be implemented as web services respectively utilized by the speech recognition device 102 and the computing device 108. The speech recognition device 102 may utilize the text upload service 132 to upload the text 110 to the remote storage device, and the computing device 108 may utilize the text delivery service 134 to retrieve the text from the remote storage device. The storage device 104 may also include an authentication service not shown that handles authentication for uploading and retrieving the text. The speech recognition device 102 and the computing device 108 may be required to successfully authenticate using the authentication service before respectively utilizing the text upload service 132 or the text delivery service 134.

The text upload service 132 may describe an interface with which the speech recognition device 102 may upload the text 110 for storage at the storage device 104. The interface described by the text upload service 132 may, for example, include fields for the text 110, a unique identifier for the user, and a date and time the speech input 120 was received at the speech recognition device. Such information may be included in the payload of one or more transmissions sent to the storage device 104 from the speech recognition device 102 when uploading the text 110.

The text delivery service 134 may, in some example implementations, describe an interface with which the computing device 108 may request and receive the text 110 from the storage device 104. In these example implementations, the storage device 104 may deliver the text 110 to the computing device 108 in response to receipt of a request from the computing device. The request from the computing device 108 may, for example, include a unique identifier that the text delivery service 134 utilizes to retrieve text 110 from the data store 130 that is associated with that user identifier. The request from the computing device 108 may also include a date and time, a date range, or a range of times that the text delivery service utilizes to retrieve text 110 from the data store 130 that matches or falls within the provided dates, times, or ranges of such.

In other example implementations, the text delivery service 134 may be configured to utilize push technology to automatically deliver the text 110 to the computing device 108. Having authenticated the computing device 108 and established a communication session, the text delivery service may push the text 110 uploaded from the speech recognition device 102 to the computing device 108 in real time or at periodic intervals. Similar to the real time processes described above, the receipt, storage, and delivery of the text 110 may have a collective real time factor of less than or equal to one. Additionally the periodic interval at which the text delivery service 134 pushes the text 110 to the computing device 108 may be, for example, 100, 250, or 500 ms. Other periodic intervals may be selectively employed.

As described in further detail below, the storage device 104 may be configured to provide functionality beyond receiving, storing, and delivering speech-derived text. Accordingly various implementations of the storage device 104 and the computing device 108 may include additional and alternative elements to provide this additional functionality. Some examples of functionality the storage device 104 may be configured to provide include natural language processing of the text 110 which is described in further detail below with reference to FIGS. 10A-C.

As seen in FIG. 1, the computing device 108 that receives the text 110 is located remotely relative to both the storage device 104 and the speech recognition device 102. The computing device 108 may be any type of computing device configured to communicate via the network 106 such as, for example, application servers, desktop computers, laptop computers, tablet computers, palmtop computers, video game consoles, "smart" televisions, and other types of network-connectable computing devices that will be appreciated by those skilled in the art.

The example computing device 108 in FIG. 1 includes a data store 136 that stores the text 110 received from the storage device 104. Similar to storage of the text 110 at the data store 116 of the speech recognition device 102 and at the data store 130 of the storage device 104, the data store 136 may, in some example implementations, store dictation records having fields for the text 110 as well as date and time information associated with the text, in some example implementations, receipt of the text 110 at the computing device 108 may cause the computing device to store the text 110 in a copy buffer (e.g., a clipboard) such that the text is available to be pasted into a target at the computing device in response to receipt of a paste command. The target may be, for example, a native application residing at the computing device 108.

One or more native software applications such as native application 138 may be installed at the computing device. Examples of native software applications include document editing applications, web browsers, graphics editing applications, client applications for virtualized software applications, and other types of software applications that will be appreciated by those skilled in the art. The native application 138 may include an interface 140 that presents the text 110. The interface 140 may be a virtual interface such as a graphical user interface (GUI) or command line interface configured to visually present the text 110 to the user. The text 110 may additionally be provided to a text-to-speech engine at the computing device 108 and provided as audio at an audio output device. The text 110 may even be provided to a refreshable braille display (i.e., a braille terminal) attached to the computing device 108 for tactile presentation to a user.

In one example implementation, the storage device may be part of a webserver that serves a webpage that includes the text 110. A user at the computing device 108 may utilize a web browser to navigate to the webpage using an address of the webpage, e.g., a Uniform Resource Locator (URL). The URL may include a username associated with the user that provided the speech input 120 at the speech recognition device 102. Accordingly the webserver may serve multiple webpages for multiple users with the address including or otherwise associated with the respective usernames for those users. In some example implementations, the webserver may require a user to logon (e.g., with the username and a password) before allowing the user to access the webpage. When the web browser displays the webpage with the text 110, the user may copy the text from the webpage and paste it into other applications at the computing device 108. The webpage may also be configured to periodically refresh (e.g., every 1-10 seconds), to display any new text that has been received and stored at the storage device 104 since the last refresh. As described in further detail below, push technology may be employed to push new text to the webpage from the storage device 104.

Figure 2:
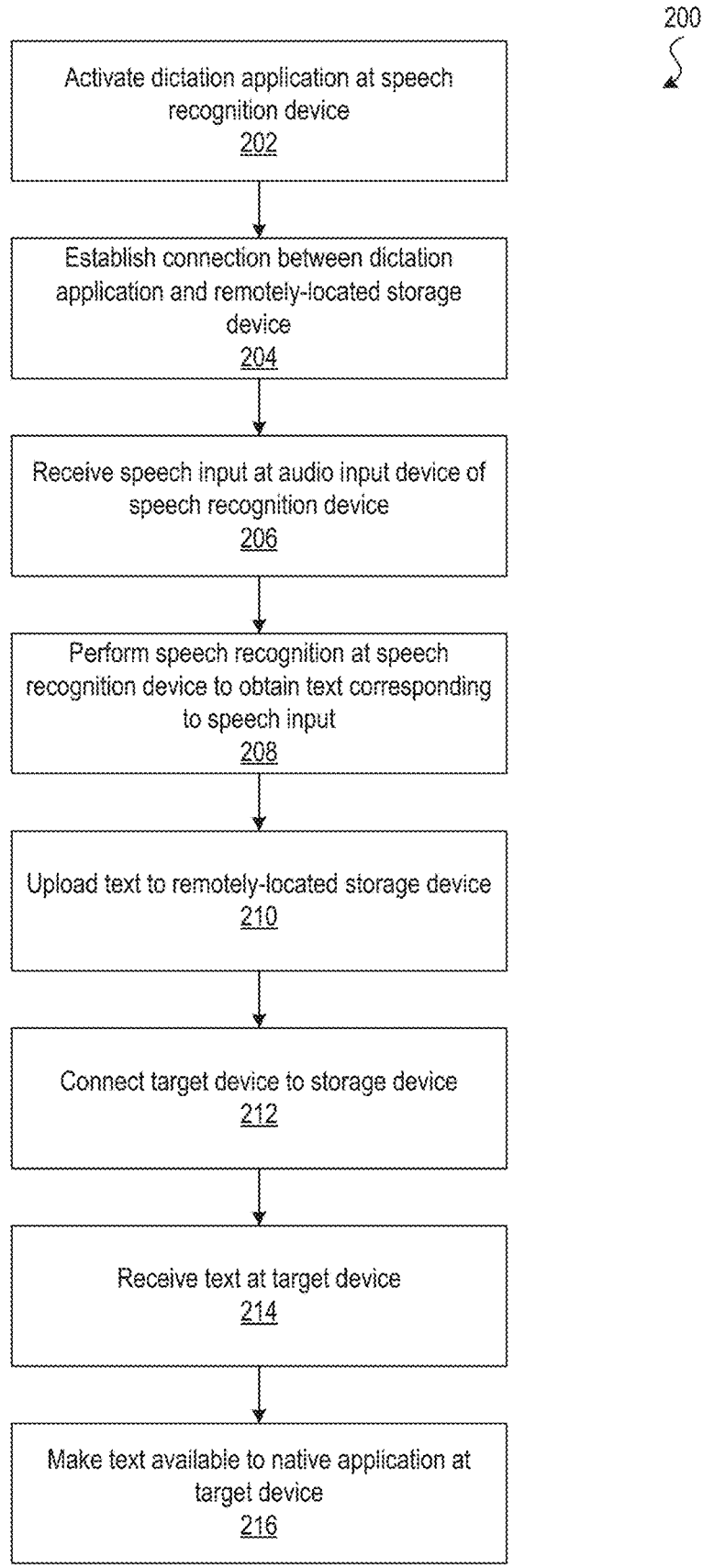
FIG. 2 is a flowchart of example method steps for performing speech recognition according to illustrative aspects described herein.

FIG. 2 is a flowchart 200 of example method steps for performing speech recognition according to illustrative aspects described herein. A user may activate a dictation application at a speech recognition device (block 202). The dictation application may then establish a connection with a remotely-located storage device (block 204), e.g., via a network that includes an intranet or Internet. As described above, the user may be required to successfully authenticate before the dictation application establishes the connection with the remotely-located storage device. The speech recognition device may receive speech input at an audio input device (block 206). The speech recognition device may perform a speech recognition process to obtain text corresponding to the speech input (block 208), and then upload the text to the remotely-located storage device (block 210). As described above, receipt of the text at the storage device may cause the storage device to store the text in a data store.

A target device (e.g., a computing device) may then also establish a connection with the remotely-located storage device (block 212). A user at the target device may also be required to authenticate before the target device establishes the connection with the remotely-located storage device. Having connected to the storage device, the target device may then receive the stored text that corresponds to the speech input received at the speech recognition device (block 214). The text may be pulled from the storage device to the target device, e.g., the target device may request the text from the storage device which provides the text in response. The text may, additionally or alternatively, be pushed from the storage device to the target device. Having received the text, the computing device may make the text available to an application (e.g., a native application) residing at the target device (block 216). For example, the target device may present the text at a GUI of the native application such that it is available to be selected, copied, and pasted at the computing device in response to user input received. The target device may also automatically store the text in a copy buffer at the native computing device such that it is immediately available to be pasted. In some example implementations, the target device may insert the text into a text field of an application running at the target device. After pasting the text into one text field, the target device may automatically move the text cursor to a subsequent text field that receives text subsequently received from the remotely-located storage device. Additional and alternative implementations will be appreciated with the benefit of this disclosure. Furthermore a speech recognition process may include additional and alternative steps in accordance with various aspects described above.

Figure 3:
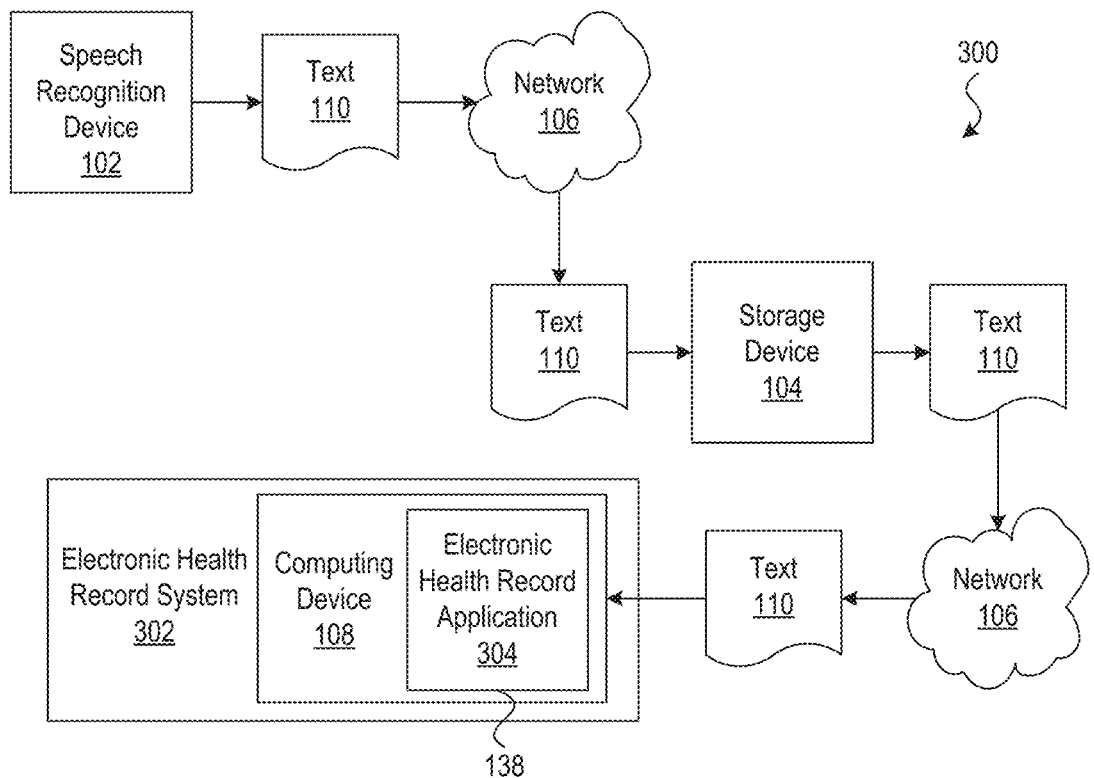
FIG. 3 is another example of an implementation of a speech recognition system according to illustrative aspects described herein.
Figure 4:
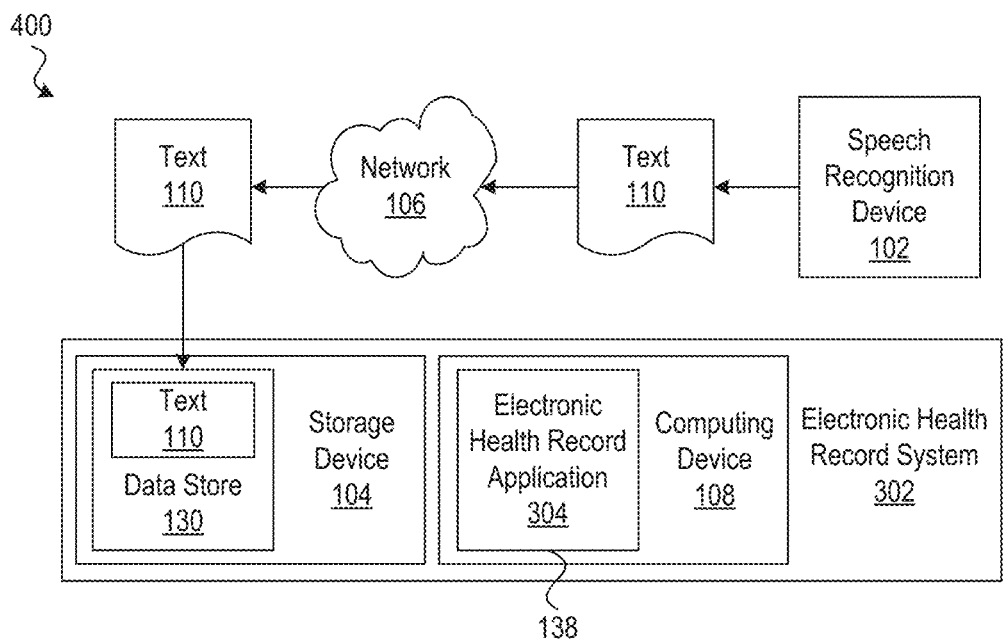
FIG. 4 is an additional example of an implementation of a speech recognition system according to illustrative aspects described herein.

The speech recognition process described above may be employed in a variety of contexts. FIGS. 3 and 4, for example, illustrate one way in which the speech recognition process described herein may be employed in the medical or health services context. In FIG. 3, an example of an implementation of a speech recognition system 300 is shown. In this example implementation, the computing device 108 that receives the text may be part of an electronic health records (EHR) system 302. Furthermore the native application 138 at the computing device 108 may be an electronic health record application 304. As seen in the example implementation of the system 300 in FIG. 3, the storage device 104 is remotely located relative to both the speech recognition device 102 and the EHR system 302. The EHR system 302 may thus receive the text 110 using approaches similar to those described by way of example above.

Another example implementation of a speech recognition system 400 is shown in FIG. 4. In this example implementation, the remotely-located storage device 104 that the speech recognition device 102 uploads the text 110 to is a component of the EHR system 302 itself. In this way, the EHR application 304 may directly access and utilize the text 110 stored at the data store 130 of the storage device 104. As used in this description an EHR system and EHR application refer to a system and corresponding software application used to create and modify health records stored in an electronic format. Additional and alternative implementations will be appreciated with the benefit of this disclosure.

Accordingly in one example embodiment a speech recognition device may include an audio input device, a speech recognition engine, and memory storing computer-executable instructions. The speech recognition engine may, in operation, obtain text corresponding to speech input received at the audio input device. The instructions, when executed, cause the speech recognition device to upload the text to a storage device that is located remotely relative to the speech recognition device. The storage device may then provide the text to an electronic health record software application of an electronic health record system.

In another example embodiment a speech recognition system may include a storage device and memory storing computer-readable instructions. The storage device may receive text from a speech recognition device that is located remotely relative to the storage device where the text is obtained at the speech recognition device and corresponds to speech input received at the speech recognition device. The instructions, when executed, may cause the storage device to provide the text to an electronic health record software application of an electronic health record system.

In a further example embodiment a speech recognition method is provided. Speech input may be received at an audio input device of a speech recognition device. Text that corresponds to the speech input received may be obtained using a speech engine of the speech recognition device. The text may be uploaded from the speech recognition device to a storage device that is located remotely relative to the speech recognition device. Receipt of the text at the storage device may cause the storage device to store the text such that the text is available to be provided to an electronic health record software application of an electronic health record system.

In some example embodiments, the storage device may be located remotely relative to both the speech recognition device and the ERR system.

In some example embodiments, the storage device may be located at the ERR system itself.

In some example embodiments, the speech recognition device may upload the text to the storage device in real time, and the storage device may provide the text to the ERR system in real time.

In some example embodiments, the speech recognition device may upload the text to the storage device at a periodic interval, and the storage device may provide the text to the ERR system at a periodic interval.

In some example embodiments, the speech recognition device may upload the text to the storage device in response to receipt at the speech recognition device of user input corresponding to an upload command.

In some example embodiments, the speech recognition device may modify the text in response to user input received at the speech recognition device before uploading the text to the storage device.

In some example implementations, the storage device may push the text to the ERR system.

In some example implementations, providing the text to the ERR system causes a computing device at the EHR system to store the text in a copy buffer.

In some example implementations, providing the text to the ERR system causes a computing device at the ERR system to insert the text at a current position of a text cursor within a text field of the EHR application that is executing at the computing device.

Figure 5A:
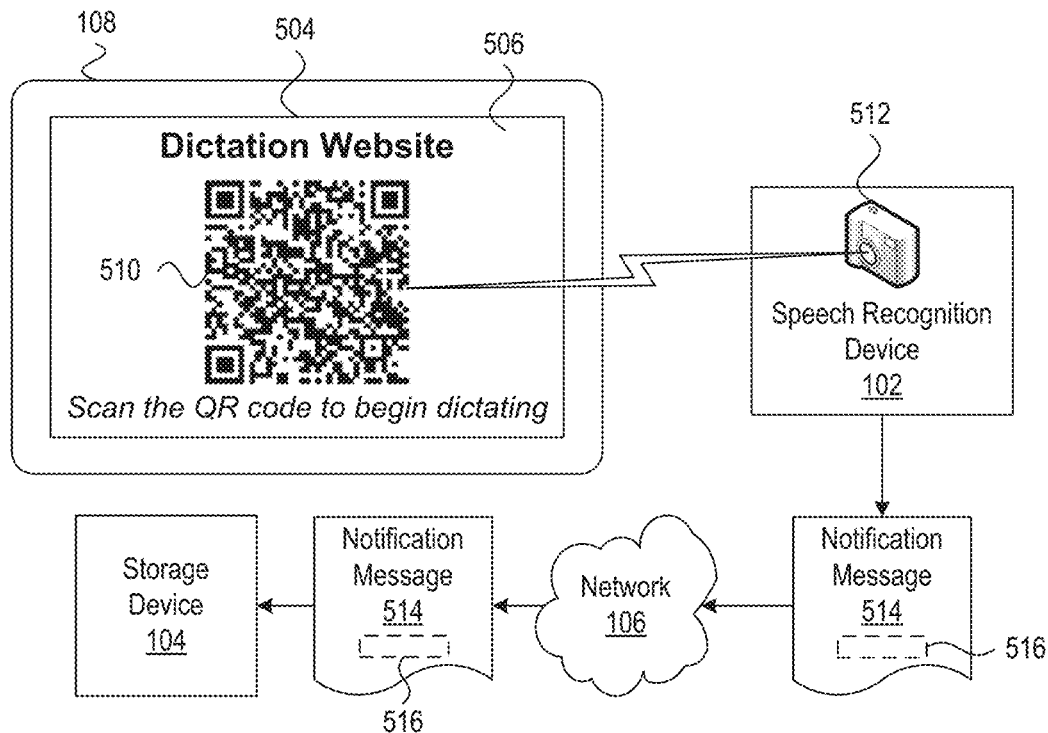
FIG. 5A is an example workflow of an implementation of a speech recognition system according to illustrative aspects described herein.
Figure 5B:
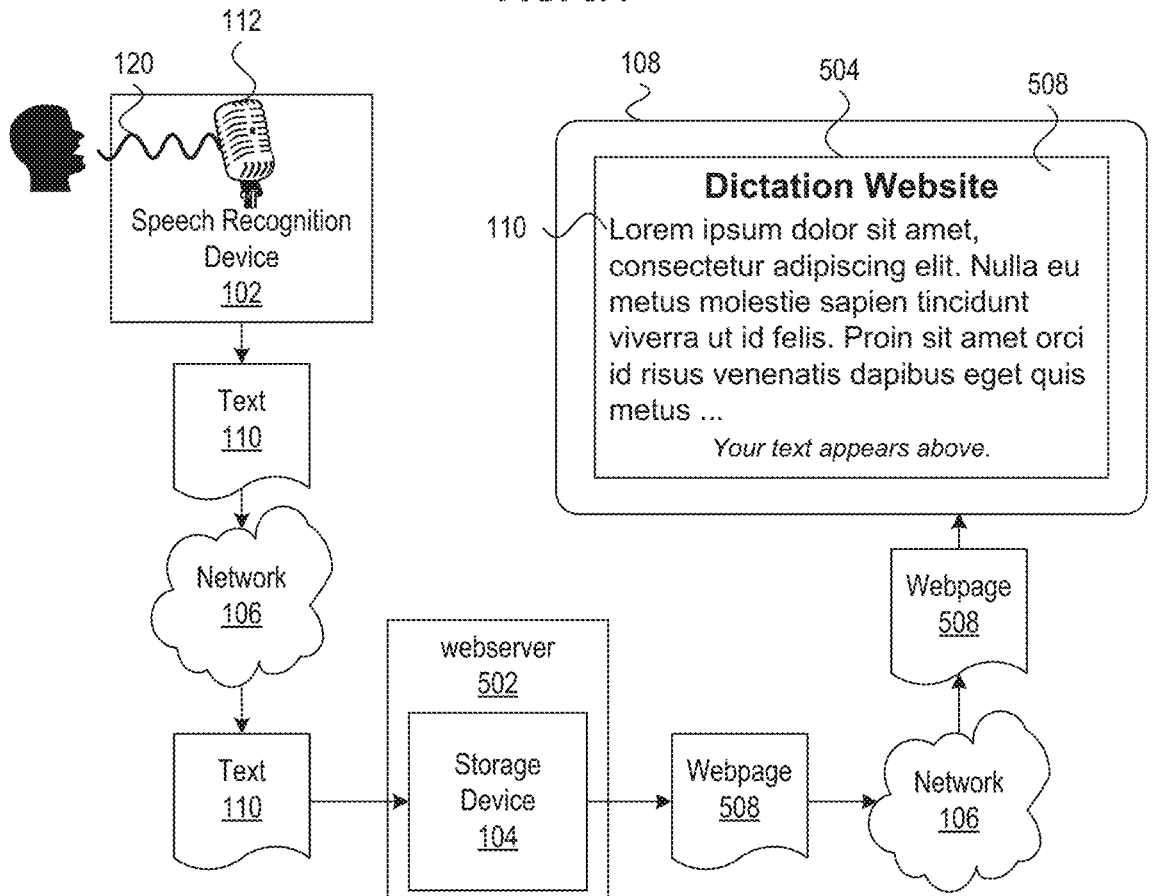
FIG. 5B is another example workflow of an implementation of a speech recognition system according to illustrative aspects described herein.

Referring now to FIG. 5A and FIG. 5B, example workflows for accessing speech-derived text 110 from a webpage is shown. For clarity, not all of the components of the speech recognition device 102 are shown in FIGS. 5A-B. It will be appreciated that by making the speech-derived text accessible from a webpage, a user may advantageously utilize any computer having a web browser and Internet connection as the target computing device 108. The target computing device 108 may thus advantageously be a personal computing device of the user (e.g., a home desktop), a computing device assigned to the user (e.g., a work laptop), or a third-party computing device that the user has access to (e.g., a library desktop) or is given access to.

As noted above, the storage device 104 may be part of a webserver 502 that serves webpages to access and view the speech-derived text 110 uploaded during dictation sessions at the speech recognition device 102. A user may access the webpages by navigating to the appropriate URL using a web browser 504. The initial webpage presented to the user at the web browser 504 may be a login webpage 506. In some example implementations, the user may login at the webpage 506 using a username and password. Upon login, the web browser 504 may present a text display webpage 508 that includes the speech-derived text 110 uploaded from the speech recognition device 102 and associated with the user name of the user. When generating the webpage 508, the webserver 502 may retrieve one or more dictation records associated with the user via a unique user identifier such as the username for the user. Other types of unique user identifiers may be selectively employed. The webpage 508 may be configured to periodically refresh to display new text 110 uploaded from the speech-recognition device during a current dictation session. As noted above, the new text 110 may be pushed to the webpage 508 using push technology. Accordingly the webpage 508 may be configured to display text from either or both of previous dictation sessions or a current dictation session.

Some example implementation of the speech recognition system may be configured to additionally or alternatively utilize an optical login process. With reference to FIG. 5A, the webserver 502 may generate a unique identifier when a user accesses the login webpage 506. For purposes of convenience this unique identifier is referred to in this disclosure as a session identifier (ID). The session identifier may be, e.g., a randomly generated and unique hexadecimal character string. The webserver 502 may encode the session ID in a barcode such as, e.g., a QR code. As shown by way of example in FIG. 5A, the webserver 502 may then include a barcode such as QR code 510 in the login webpage 506. The user may then scan the QR code 510 with an image input device 512 (e.g., a camera) of the speech recognition device 102. In response to scanning the QR code 512, the dictation application 118 at the speech recognition device 102 may transmit a notification message 514 to the storage device 104. The notification message 514 may include a payload 516 that includes the session ID decoded from the QR code 512 as well as a unique user identifier for the user, e.g., a username or other type of user ID.

In response to receipt of the notification message 514, the storage device 104 may establish an association between the session ID and the user ID. Once the session ID has been associated with the user ID, the webserver 502 may generate the text display webpage 508 and provide the text display webpage to the target computing device for display at the web browser 504. In some example implementations, the login webpage 506 may be configured to periodically submit a request for the text display webpage 508 from the webserver 502. In response to receipt of the request, the webserver 502 may determine whether the session ID has been associated with the user D. If so, the webserver 502 may provide the text display webpage 508 in response. In other example implementations, the webserver 502 may be configured to push the text display webpage 508 to the target computing device 108 in response to a determination that the session ID has been associated with the user ID. As noted above, the text display webpage 508 may include speech-derived text from previous dictation sessions, a current dictation session, or both previous and current dictation sessions.

As also noted above, the text display webpage 508 may be configured to periodically refresh or received a push message thus allowing a user to view newly derived text during a current ongoing dictation session. The webserver 502 may periodically send updated text display webpages 508 to refresh the speech-derived text 110 included therein. The webpage 508 may also be configured to automatically copy the text 110 displayed at the webpage to a copy buffer (e.g., the clipboard) of the target computing device 108. A programming language or scripting language such as, e.g., Java or JavaScript, may be employed to automatically copy the test of the webpage 508 to the clipboard. Those skilled in the art of web technologies will readily appreciate the function calls necessary to implement this aspect of the speech recognition system described.

Figure 6:
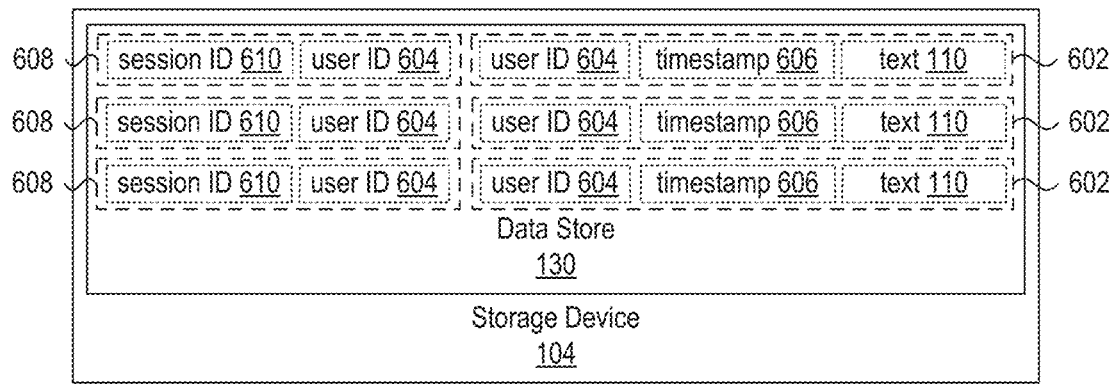
FIG. 6 is an example of an implementation of a storage device that stores speech-derived text according to illustrative aspects described herein.

Referring now to FIG. 6, a block diagram of the storage device 104 and data store 130 is shown. For clarity, not all of the components of the storage device 104 are shown in FIG. 6. As noted above, the storage device 104 may create and store at the data store 130 a dictation record 602 for each dictation session performed by the user. The dictation record 602 may include the user ID 604 associated with the user that performed the dictation, a timestamp 606 that indicates a date and time the user performed the dictation, and the text 110 derived from the speech provided by the user during the dictation session. As seen in FIG. 6, the data store 130 may store multiple dictation records 602 for the same user. As noted above, a text display webpage 508 may include the text 110 from one or more of these dictation records. It will also be appreciated that the data store 130 may include additional dictation records for additional users where such additional dictation records are associated with those additional users via their respective user IDs.

As also seen in FIG. 6, the data store 130 may include one or more session records 608 that associate a session ID 610 with a user ID 604. The session records 608 are thus associated with the dictation records via the user ID 604. In this way, the webserver 502 may retrieve dictation records 602 from the data store 130 using the session TD 610 that was generated when the user accessed the webpage 506.

Figure 7:
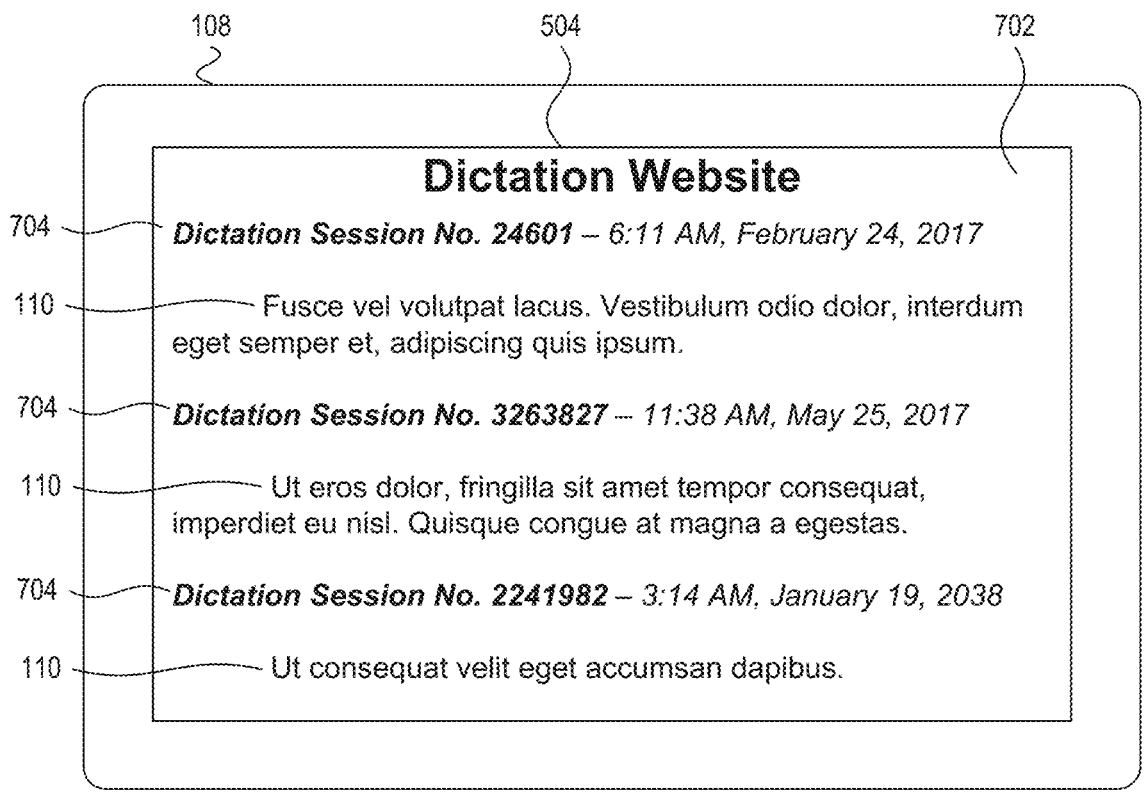
FIG. 7 is a webpage that displays speech-derived text according to illustrative aspects described herein.

Referring now to FIG. 7, another example of a text display webpage 702 that may be displayed at the web browser 504 of the target computing device 108 is shown. The text display webpage 702, in this example, includes multiple line items 704 respectively corresponding to multiple dictation sessions performed by the user. As seen, each line item 704 includes a unique dictation session ID, a date and time the dictation session was performed, and the text 110 derived from the speech provided during the dictation sessions. It will be appreciated that additional and alternative configurations for the text display webpages may be selectively employed.

Figure 8:
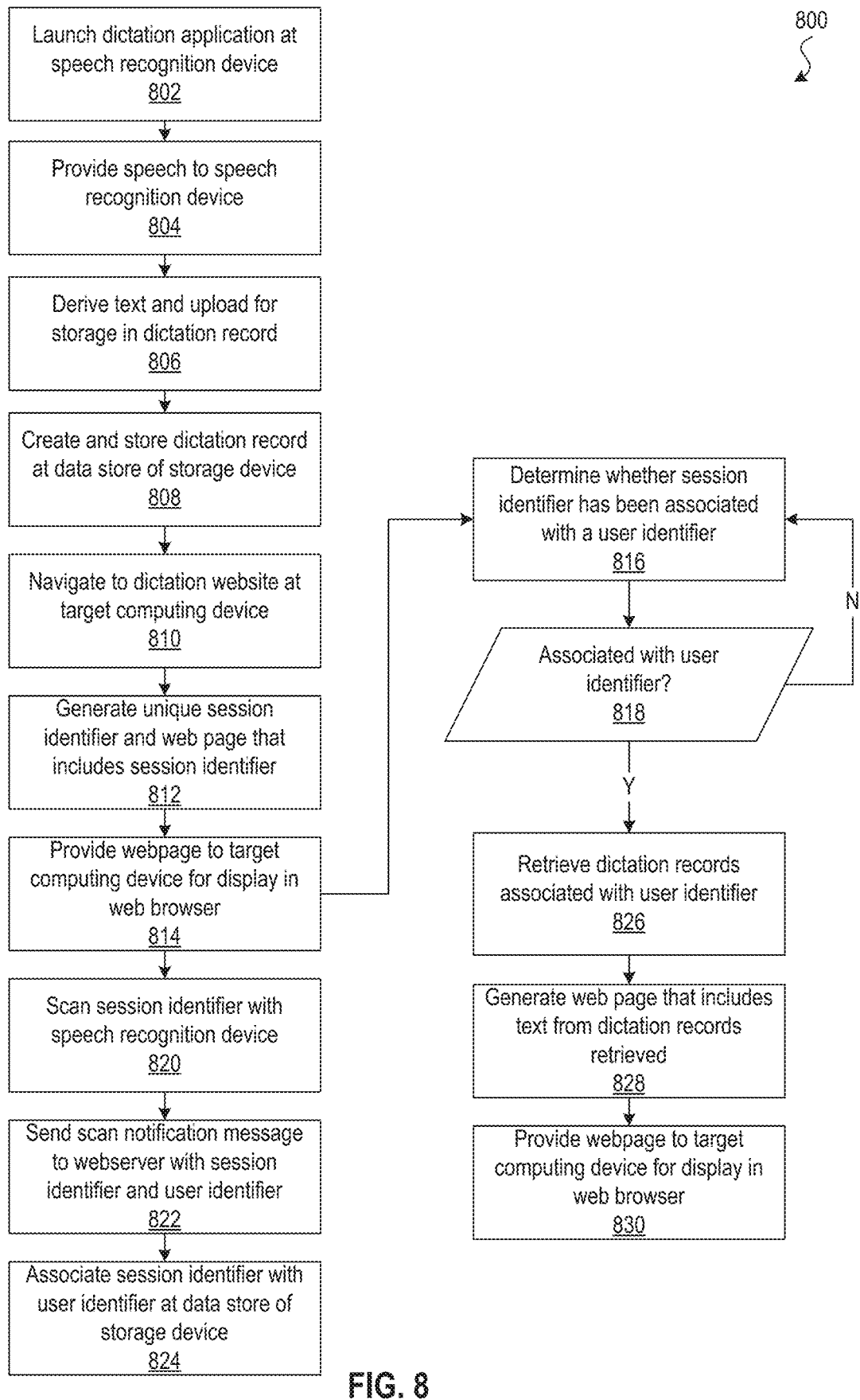
FIG. 8 is a flowchart of example method steps for performing dictation at a speech recognition device and subsequently viewing the speech derived text at a target computing device.

Referring now to FIG. 8, a flowchart 800 of example method steps for performing dictation at a speech recognition device and subsequently viewing the speech derived text at a target computing device is shown. A user may launch the dictation application at the speech recognition device (block 802) and provide speech to the speech recognition device (block 804). The dictation application may derive text from the speech provided and upload the text to a remotely-located storage device for storage in a dictation record (block 806) as described above. Upon receipt of the text, the remotely-located storage device may create a new dictation record and store the new dictation record at a data store (block 808).

After the dictation session is complete, the user may navigate to the dictation website from a target computing device (block 810). Upon receipt of the request for the login webpage of the dictation website, a webserver may generate a unique session ID and include the session ID in the login webpage (block 812). As noted above, the webserver may encode the session ID in a barcode, e.g., a two-dimensional barcode such as a QR code. Alternative types of encodings may be selectively employed such as, e.g., a one-dimensional barcode. The webserver may also include the session ID as plaintext in the login webpage wherein the optical login process involves obtaining an image of the session ID on the login webpage and performing an optical character recognition (OCR) process at the speech recognition device.

The webserver may then provide the login webpage to the target computing device for display in the web browser (block 814) as described above. The webserver may initiate a process to determine whether the session ID has been associated with a user ID (block 816). The webserver may, for example, periodically query the data store to determination if an association exists between the session ID and a user ID, e.g., in a session record. If the association between the session ID and the user ID does not yet exist (block 818:N), then the webserver may continue to periodically query the data store. In some example implementations, the session ID may expire after a predetermined time period (e.g., after 60, 90, 300, or 600 seconds), and the webserver may cease querying the data store after this time period expires. If the session ID expires, the user may refresh the login page to generate a new session ID.

At the login webpage, the user may scan the session ID with the speech recognition device (block 820) as described above. In response to scanning the session ID, the dictation application may send a scan notification message to the webserver with the session ID and the user ID of the user (block 822). Upon receiving the scan notification message, the webserver may associate the session ID with the user ID at the data store of the storage device (block 824), e.g., by creating a new session record as described above. The webserver may then determine that the session ID has been associated with a user ID (block 818:Y) and retrieve one or more previously stored dictation records associated with that user ID (block 826). The webserver may then generate a text display webpage that includes the speech-derived text in those previously stored dictation records (block 828) and provide the webpage to the target computing device for display in the web browser (block 830). As noted above the webserver may push the text display webpage to the target computing device or provide the webpage in response (e.g., an HTTP response) to a requested (e.g., an HTTP request) received from the target computing device. The request sent from the target computing device to the webserver may include the session ID generated for the login webpage.

Figure 9:
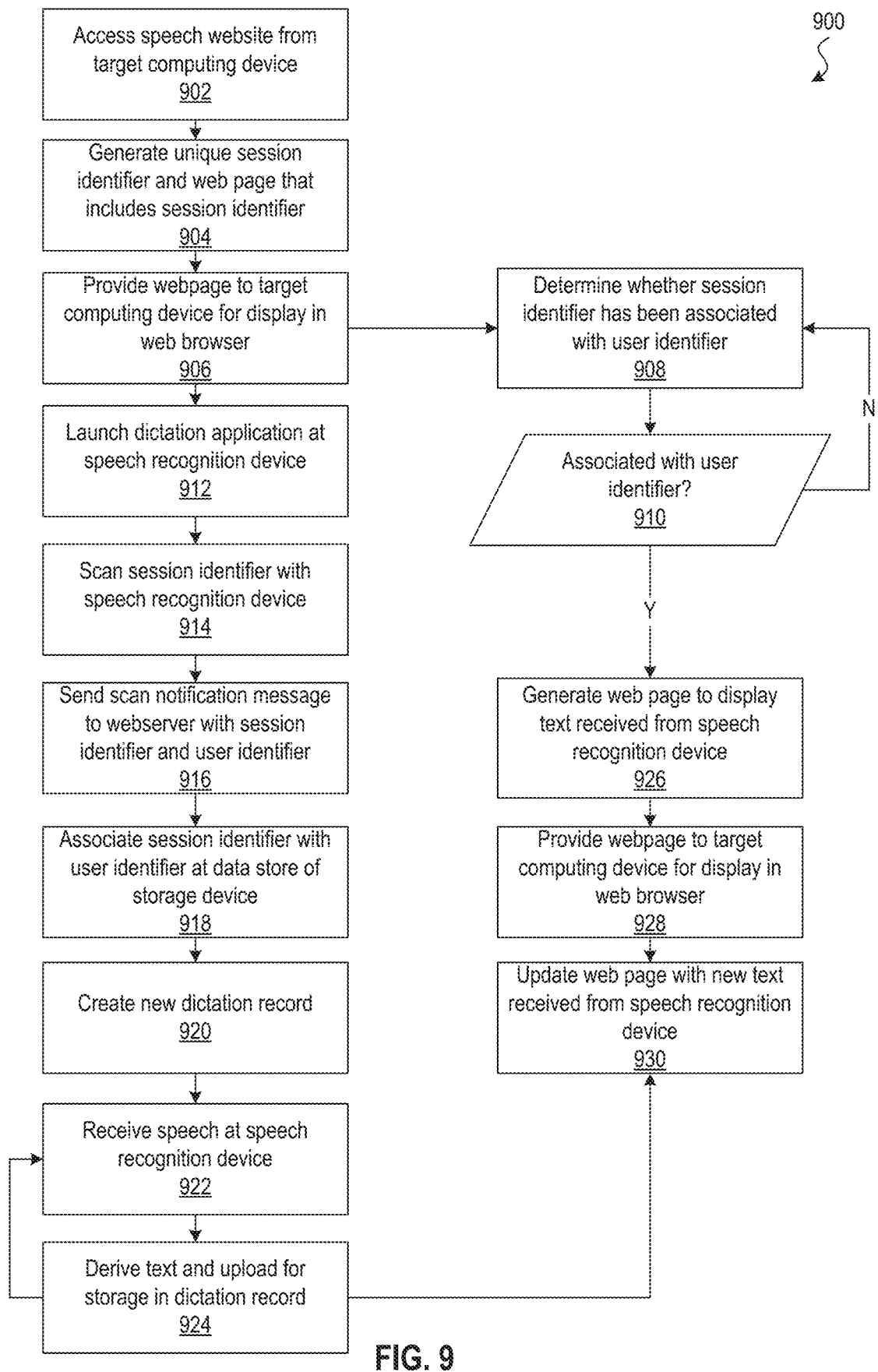
FIG. 9 is a flowchart of example method steps for viewing speech-derived text at a target computing device while performing dictation at a speech recognition device.

FIG. 9 is a flowchart 900 of example method steps for viewing speech-derived text at a target computing device while performing dictation at a speech recognition device. In this example scenario, the user accesses the speech website before initiating a dictation session and subsequently observes the accumulation of speech-derived text on a text display webpage during the dictation session. As described above, the user may access the speech website front the target computing device (block 902) causing the webserver to generate a unique session ID and a webpage that includes the session ID (block 904). The webserver may then provide the webpage to the target computing device for display in a web browser (block 906). Having generated the session ID, the webserver may determine whether the session ID has been associated with a user ID at the data store of the storage device (block 908) as described above. If not (block 910:N), then the webserver may periodically query the data store until it determines the session ID has been associated with a user ID.

Upon receiving the login webpage at the target computing device, the user may launch the dictation application at the speech recognition device (block 912) and scan the session ID at the login webpage with the speech recognition device (block 914). The dictation application may then send a scan notification message to the webserver with the session TD and the user ID for the user (block 916) as also described above. Upon receipt of the scan notification message, the webserver may associate the session ID with the user ID at the data store of the storage device (block 918), and create a new dictation record (block 920). The user may then provide speech to the speech recognition device (block 922), and the dictation application may derive text from the speech provide and upload the text for storage in the dictation record (block 924).

Once the webserver determines that the session ID has been associated with the user ID (block 910:Y), the webserver may generate a text display webpage for to display the speech-derived text received from the speech recognition device (block 926). The webserver may provide the text display webpage to the target computing device for display in a web browser (block 928), and the webserver may update the webpage with new text received from the speech recognition device during the dictation session (block 930). The webserver may continue to update the text display webpage throughout the duration of the dictation session thus allowing the user to watch as the text accumulates in the webpage as the dictation session proceeds. The webserver may update the webpage by providing entirely new text display webpages that include the most recent speech-derived text or, additionally or alternatively, by pushing recent speech-derived text to the web browser at the target computing device.

It will be appreciated that the steps described with reference to FIG. 8 and FIG. 9 are described by way of example only. Additional and alternative steps may be selectively performed in various implementations to receive speech at a mobile speech recognition device, obtain text from the speech at the speech recognition device, upload the speech to a remotely-located storage device, and deliver the text to a target computing device.

Furthermore the web browser-based implementations discussed above are described by way of example only. The same techniques may be employed with other native applications at a target computing device. In particular, a plug-in, add-on, or other type of extension to a native application may be installed at the target computing device. The extension may be configured to automatically generate a session ID and display the session ID in a barcode) at the user interface of the native application upon launch of the native application. The user may then scan the session ID displayed at the native application as described above to associate the session ID with a user ID of the user as also described above. The extension may then establish a connection to the storage device and receive the text derived from speech provided by the user, e.g., using a push or pull communication protocol. The extension may then insert the text received from the storage device at a cursor position in the native application. It will also be appreciated that applications may also be developed to inherently include such functionality rather than rely on a plug-in, add-on, or other type of extension.

Figure 10A:
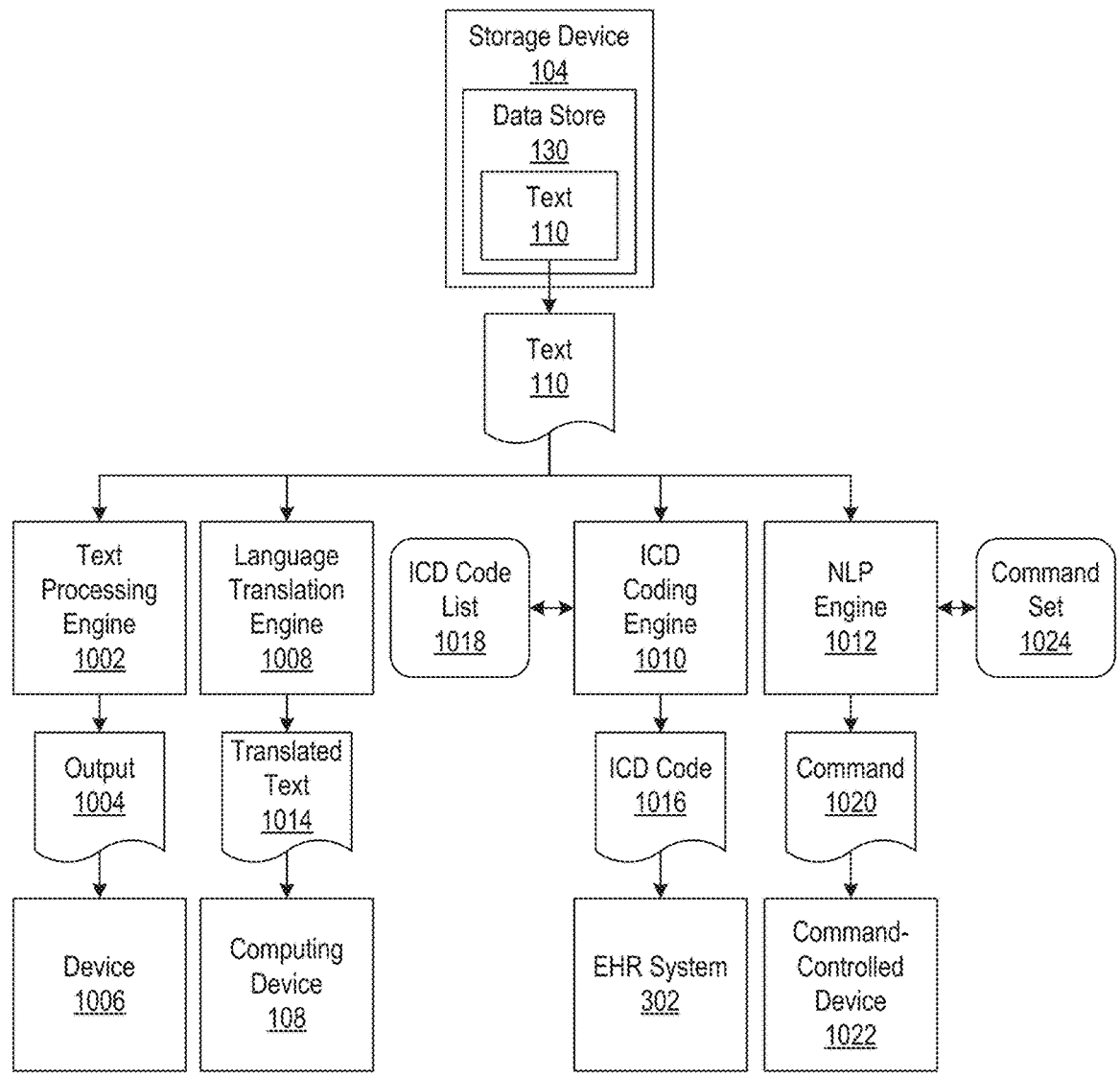
FIG. 10A is an example workflow of interactions between a speech recognition system and various text-processing engines according to illustrative aspects described herein.

In addition to being accessible at any web-enabled computing device, the speech-derived text may also be utilized for other advantageous purposes. Referring to FIG. 10A, once the text 110 is stored at the data store 130 of the storage device 104, for example, the speech-derived text may be subsequently provided to a text-processing engine 1002 to produce output 1004 that may then be provided to other electronic or electrical devices such as device 1006. The storage device 104 may be directly connected to the text-processing engine 1002 or indirectly connected to the text-processing engine via a network such as network 106 in FIG. 1.

Various types of text-processing engines may be selectively employed to process the speech-derived text 110 from the storage device 104. As shown by way of example in FIG. 10A, some types of text-processing engines may include a language translation engine 1008, an ICD (International Classification of Diseases) coding engine 1010, an NLP (Natural Language Processing) engine 1012.

The language translation engine 1008 may be configured to translate the speech-derived text 110 from a source language to a target language, e.g., from English to German. The output of the language translation engine 1008 may thus be translated text 1014. The translated text 1014 may then be provided to a computing device 108 in a fashion similar to that of the speech-derived text 110 as described above.

The ICD coding engine 1010 may be configured to analyze the speech-derived text 110 and determine which ICD code in an ICD code list 1018 best matches the information included in the text. The ICD code list 1018 may pair alphanumeric codes with corresponding descriptions or keywords. The ICD coding engine 1010 may thus match one or more words in the speech-derived text 110 to the descriptions or keywords in the ICD code list 1018. The output of the ICD coding engine 1010 may thus be one or more ICD codes 1016. The ICD code 1016 derived from the text 110 may then be provided to, e.g., an EHR system such as EHR system 302 for storage with an electronic health record.

The NLP engine 1012 may be configured to perform natural language processing on the speech-derived text 110 in order to derive meaning from the text. In some example implementations, the NLP engine 1012 may be employed to derive a command 1020 from the speech-derived text 110. The command 1020 may then be provided to a commandcontrolled electronic or electric device 1022. In some example implementations, the NLP processing engine 1012 may query a command set 1024 to determine which command in the command set best matches the information included in the speech-derived text 110. In this way, the dictation process provided in this disclosure may be implemented to advantageously achieve remote, hands-free control of other devices. The NLP engine 1012 may be additionally and alternatively employed to derive meaning from the text 110 received from the storage device 104. The output of the NLP engine 1012 may also be, for example, a mapping of mentions in the text or portions of the text to objects, entities, or semantic structures in a language grammar or ontology; a mapping of words or phrases in the text to corresponding parts-of-speech; a parse tree; and other types of output that will be recognized by those skilled in the art of natural language processing.

The text-processing engines in FIG. 10A are shown only by way of example. Additional and alternative types of text-processing engines may be selectively employed to take advantage of the speech-derived text 110 available from the storage device 104. It will also be appreciated that multiple text-processing engines may be interconnected such that the output of one text-processing engine is provided as input to another text-processing engine. Additional and alternative examples and implementations will be appreciated with the benefit of this disclosure.

Figure 10B:
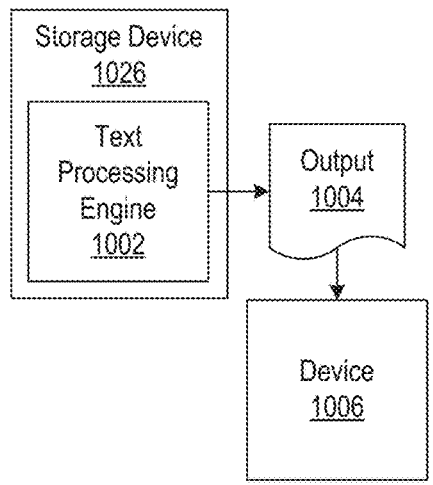
FIG. 10B is another example workflow of an interaction between a speech recognition system and a text-processing engine.
Figure 10C:
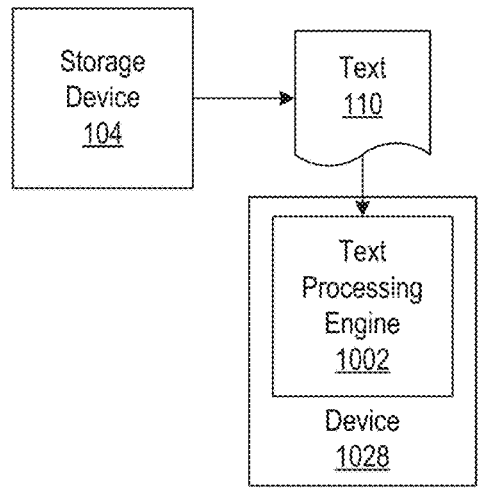
FIG. 10C is an additional example workflow of an interaction between a speech recognition system and a text-processing engine.

Furthermore FIG. 10A illustrates the storage device 104, text processing engine 1002, and target device 1006 as located remotely from each other. As seen in FIG. 10B, however, the text-processing engine 1002 may be a component of a storage device 1026. In this example, the storage device 1026 may provide the output 1004 to the target device 1006 rather than the text 110. As also seen in FIG. 10C, the text-processing engine 1002 may alternatively be a component of a target device 1028. In this other example, the storage device 104 may provide the text 110 to the target device 1028 as described above, but the target device may then process the text 110 at the text-processing engine 1002 to derive output based on the text as described above. Other example implementation and configurations will be appreciated with the benefit of this disclosure.

Figure 11:
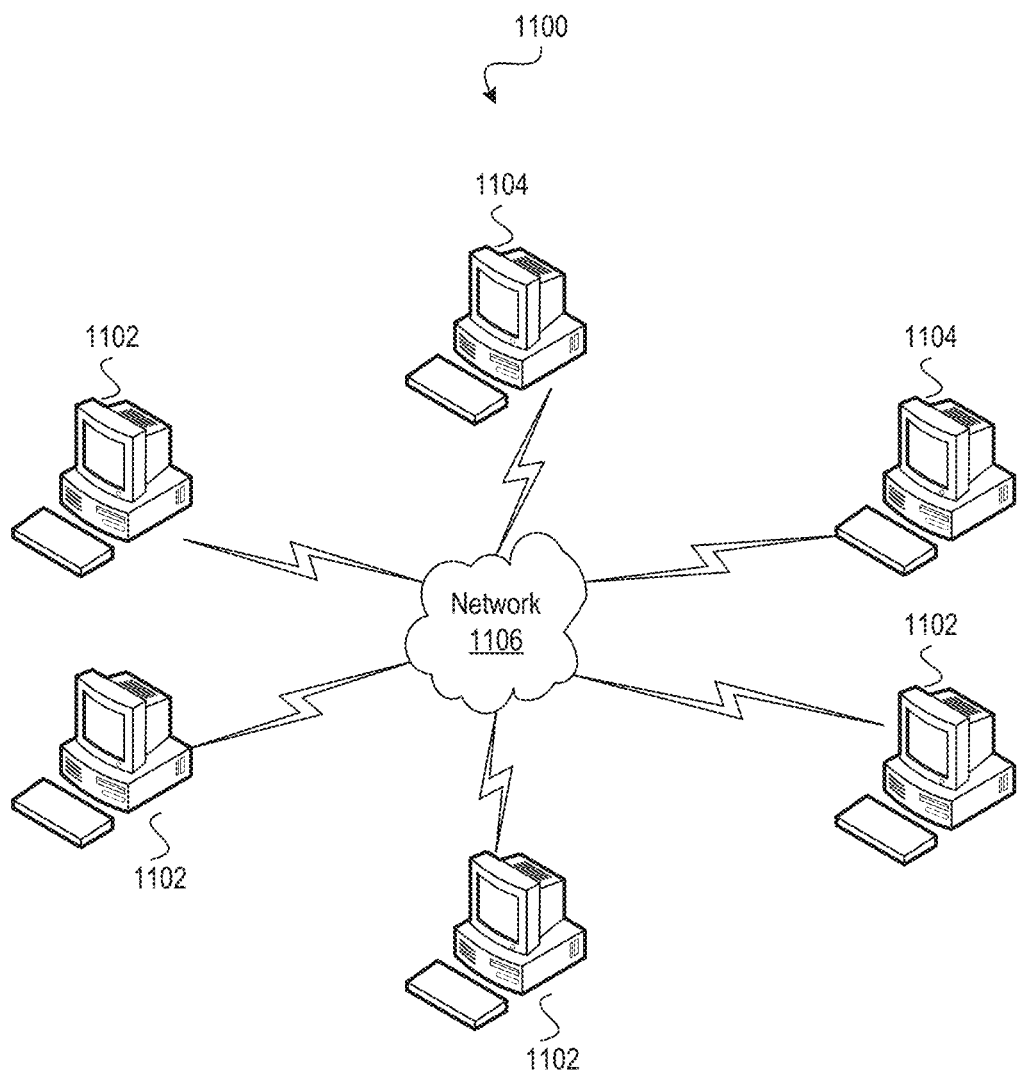
FIG. 11 is an example of an implementation of a computing environment in which aspects of the present disclosure may be implemented according to illustrative aspects described herein.

In FIG. 11, an example of an implementation of a computing environment 1100 in which aspects of the present disclosure may be implemented is shown. Client computing devices 1102 and server computing devices 1104 provide processing, storage, and input/output devices executing application programs and the like. Client computing devices 1102 may include, e.g., desktop computers, laptop computers, tablet computers, palmtop computers, smartphones, smart televisions, and the like. Client computing devices 1102 can also be linked through communications network 1106 to other computing devices, including other client devices computing devices 1102 and server computing devices 1104. Communications network 1106 can be part of a remote access network, a global network (e.g., the Internet), a cellular network, a worldwide collection of computers, local area or wide area networks, and gateways that currently use respective protocols (TCP/IP, Bluetooth, etc.) to communicate with one another. Other electronic device/computer network architectures are suitable.

Figure 12:
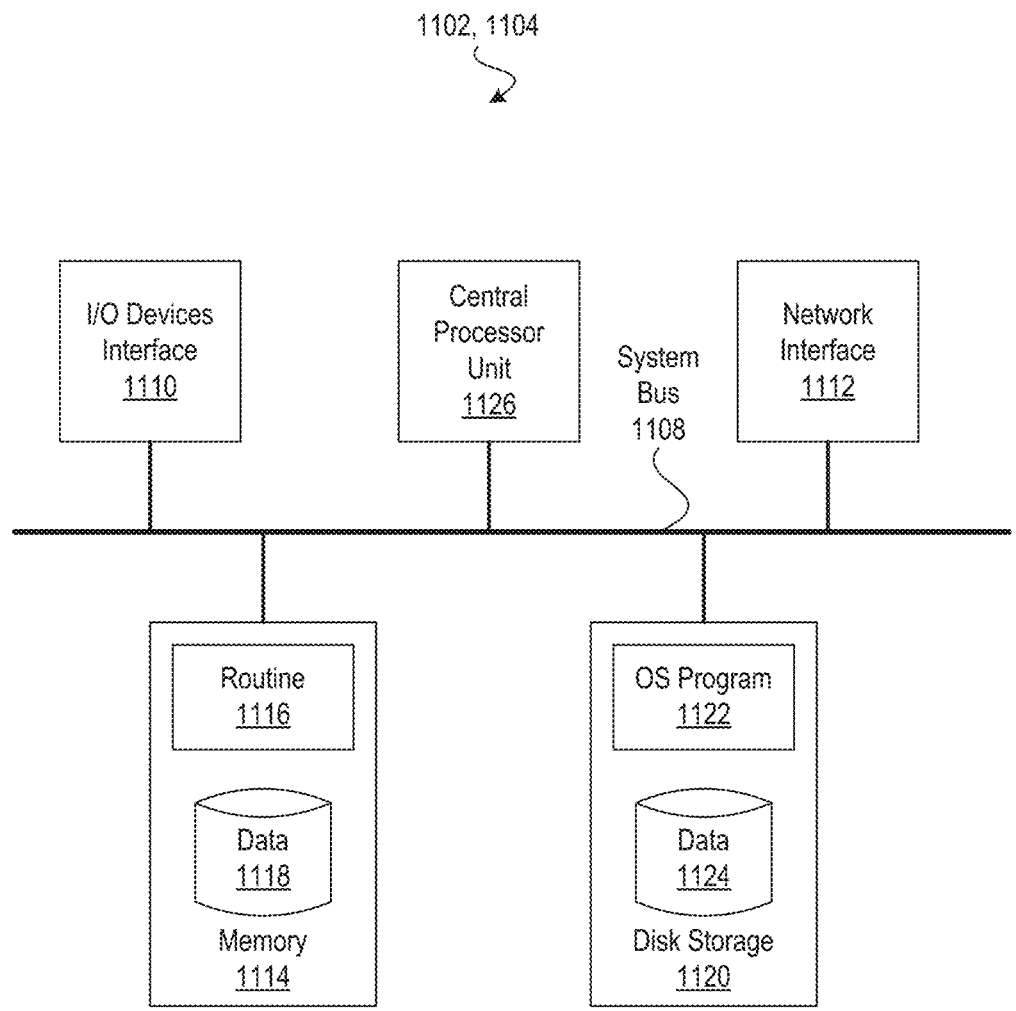
FIG. 12 is a block diagram of one of the computing devices of the computing environment of FIG. 11 according to illustrative aspects described herein.

In FIG. 12, a block diagram of one of the computing devices 1102 or 1104 of the computing environment 1100 of FIG. 11 is shown. The computing device 1102 or 1104 contains system bus 1108, where a bus is a set of hardware lines used for data transfer among the components of a computing device or processing system. Bus 1108 is essentially a shared conduit that connects different elements of a computing device (e.g., processor, disk storage, memory, input/output ports, network ports, etc.) that enables the transfer of information between the elements. Attached to system bus 1108 is I/O device interface 1110 for connecting various input and output devices (e.g., keyboard, mouse, displays, printers, speakers, etc.) to the computing device 1102 or 1104. Network interface 1112 allows the computing device to connect to various other devices attached to a network (e.g., network 1106 of FIG. 11). Memory 1114 provides volatile storage for computer software instructions 1116 and data 1118 used to implement aspects described herein (e.g., a recommendation engine implementing the steps detailed above). Disk storage 1120 provides non-volatile storage for computer software instructions 1122 and data 1124 used to implement various aspects of the present disclosure. Central processor unit 1126 is also attached to system bus 1108 and provides for the execution of computer instructions.

In one embodiment, the processor routines 1116 and 1122 as well as data 1118 and 1124 are a computer program product, including a computer-readable medium (e.g., a removable storage medium such as one or more DVD-ROM's, CD-ROM's, diskettes, tapes, etc.) that provides at least a portion of the software instructions for implementing aspects of the present disclosure. The computer program product can be installed by any suitable software installation procedure, as is well known in the art. At least a portion of the software instructions may also be downloaded over a cable, communication and/or wireless connection. Computer-readable media include all computer-readable media but do not include transitory propagating signals.

One or more aspects of the disclosure may be embodied in computer-usable or readable data and/or computer-executable instructions, such as in one or more program modules, executed by one or more computers or other devices as described herein. Generally, program modules include routines, programs, objects, components, data structures, etc. that perform particular tasks or implement particular abstract data types when executed by a processor in a computer or other device. The modules may be written in a source code programming language that is subsequently compiled for execution, or may be written in a scripting language such as (but not limited to) HTML or XML. The computer executable instructions may be stored on a computer readable medium such as a hard disk, optical disk, removable storage media, solid state memory, RAM, etc. As will be appreciated by one of skill in the art, the functionality of the program modules may be combined or distributed as desired in various embodiments. In addition, the functionality may be embodied in Whole or in part in firmware or hardware equivalents such as integrated circuits, field programmable gate arrays (FPGA), and the like. Particular data structures may be used to more effectively implement one or more aspects of the disclosure, and such data structures are contemplated within the scope of computer executable instructions and computer-usable data described herein.

While aspects have been particularly shown and described with references to example embodiments thereof, it will be understood that various changes in form and details may be made therein without departing from the scope and spirit identified by the appended claims.

What is claimed is:
1. A system for facilitating dictation comprising:
a mobile speech recognition computing device comprising a microphone and a memory, the microphone generating an electrical signal corresponding to speech received at the microphone, the memory storing instructions that, when executed by a processor of the mobile speech recognition computing device, cause the mobile speech recognition computing device to generate, locally at the mobile speech recognition computing device and from the electrical signal, text corresponding to the speech;

a storage device located remotely relative to the mobile speech recognition computing device and in signal communication with the mobile speech recognition computing device, the storage device receiving and storing the text from the mobile speech recognition computing device; and a webserver in signal communication with the storage device and located remotely relative to the mobile speech recognition computing device, the webserver comprising instructions that, when executed by a processor of the webserver, cause the webserver to:

provide a first webpage to a second computing device comprising a copy buffer and located remotely relative to the storage device, the first webpage comprising a session identifier, receive the session identifier from one of the mobile speech recognition computing device or the second computing device, associate the text with a user identifier and associate the session identifier with the user identifier, and in response to receipt of the session identifier at the webserver and responsive to determining that the user identifier has been associated with the session identifier, provide a second webpage to the second computing device, the second webpage comprising the text and the second webpage automatically copying the text to the copy buffer of the second computing device in response to display of the second webpage at the second computing device, wherein the speech is first speech, and wherein the webserver updates the second webpage to include additional text obtained from second speech received at the microphone of the mobile speech recognition computing device subsequent to the first speech.

2. The system of claim 1 further comprising:
a text-processing engine in signal communication with the storage device, the text-processing engine processing the text and providing output based on the text.

3. The system of claim 2 wherein:
the text-processing engine is a natural language processing engine.

4. The system of claim 3 wherein:
the output provided by the natural language processing engine is a command that controls a device located remotely relative to the natural language processing engine; and
the natural language processing engine provides the command to the device.

5. The system of claim 1 wherein:
the webserver encodes the session identifier in a barcode and includes the barcode in the first webpage; and
the instructions of the mobile speech recognition computing device, when executed by the processor of the mobile speech recognition computing device, further cause the mobile speech recognition computing device to decode the barcode to obtain the session identifier and transmit the session identifier and the user identifier to the storage device.

6. The system of claim 1 wherein:
the text included in the second webpage is obtained before the webserver provides the first webpage to the second computing device.

7. The system of claim 1 wherein:
the text included in the second webpage is obtained after the webserver provides the first webpage to the second computing device.

8. The system of claim 1 wherein:
the webserver updates the second webpage in real-time such that the additional text corresponding to the second speech is viewable in the second webpage at the second computing device while the second speech is received at the microphone of the mobile speech recognition computing device.

9. The system of claim 8 wherein:
the webserver updates the second webpage by pushing the additional text to the second computing device.

10. The system of claim 1 wherein:
the storage device stores the text in a dictation record of a set of dictation records; and
the second webpage comprises information corresponding to one or more dictation records of the set of dictation records stored by the storage device.

11. A computer-implemented method of performing dictation comprising:
receiving speech at a microphone of a mobile speech recognition computing device;
generating, by the microphone, an electrical signal corresponding to the speech;
obtaining, by the mobile speech recognition computing device locally at the mobile speech recognition computing device, text corresponding to the speech;
transmitting the text from the mobile speech recognition computing device to a storage device located remotely relative to the mobile speech recognition computing device;
accessing a first webpage from a second computing device that comprises a copy buffer and that is located remotely relative to the storage device, the first webpage comprising a session identifier;
transmitting the session identifier to the storage device from one of the mobile speech recognition computing device or the second computing device;
associating the text with a user identifier and associating the session identifier with the user identifier;
in response to receipt of the session identifier at the storage device and responsive to determining that the user identifier has been associated with the session identifier, receiving a second webpage comprising the text at the second computing device, the second webpage being provided by a webserver located remotely relative to the mobile speech recognition computing device and the second webpage automatically copying the text to the copy buffer of the second computing device in response to display of the second webpage at the second computing device, wherein the speech is first speech; and
updating the second webpage based upon, at least in part, additional text obtained from second speech received at the microphone of the mobile speech recognition computing device subsequent to the first speech.

12. The method of claim 11 wherein:
the speech is received at the microphone before the first webpage is accessed.

13. The method of claim 11 wherein:
the speech is received at the microphone after the first webpage is accessed.

14. The method of claim 11 further comprising:
scanning a barcode included in the first webpage with the mobile speech recognition computing device wherein, the barcode encoding the session identifier;
decoding the barcode with the mobile speech recognition computing device to obtain the session identifier; and
transmitting the session identifier to the storage device from the mobile speech recognition computing device.

15. The method of claim 11 further comprising:
transmitting a timestamp from the mobile speech recognition computing device to the storage device with the text and the user identifier; and
wherein the timestamp is included in the second webpage with the text.

16. The method of claim 11 wherein:
the second computing device receives the update in real-time.

17. The method of claim 11 further comprising:
editing the text at the mobile speech recognition computing device before transmitting the text to the storage device.

* * * * *